(No Model.)
J. W. JONES.
ANIMAL TRAP.
No. 566,912. Patented Sept. 1, 1896.
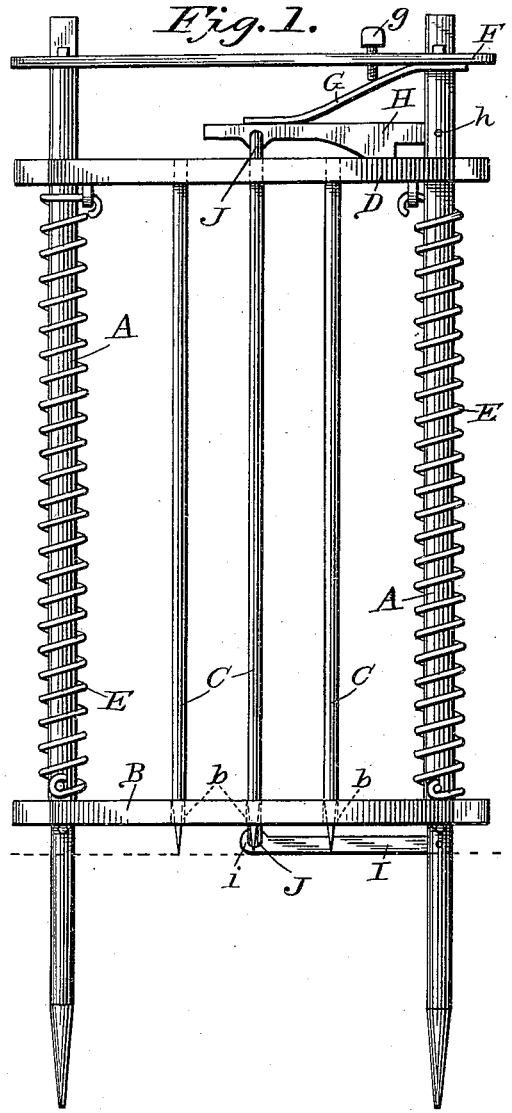
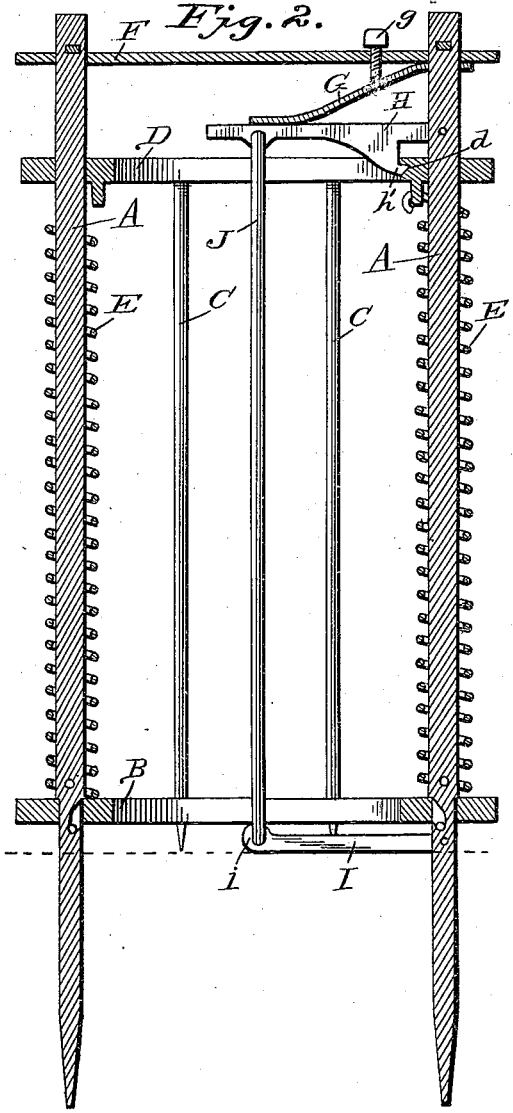
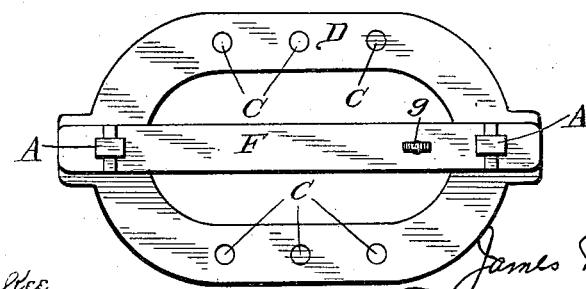
Witnesses
Edwin G. Siegler,
K. C. Nau.
Inventor
James W. Jones,
By John Wedderburn,
Attorney

UNITED STATES PATENT OFFICE.

JAMES WILLIAM JONES, OF LOCKESBURG, ARKANSAS.

ANIMAL-TRAP.

SPECIFICATION forming part of Letters Patent No. 566,912, dated September 1, 1896.

Application filed December 9, 1895. Serial No. 571,469. (No model.)

*To all whom it may concern:*

Be it known that I, JAMES WILLIAM JONES, a citizen of the United States, residing at Lockesburg, in the county of Sevier and State of Arkansas, have invented certain new and useful Improvements in Animal-Traps; and I do hereby declare the following to be a full, clear, and exact description of the invention, such as will enable others skilled in the art to which it appertains to make and use the same.

This invention relates to certain new and useful improvements in animal-traps, and while it is designed more particularly for moles it will be readily understood that the same is applicable to other animals.

It has for its objects, among others, to provide a simple and cheap trap, readily set, positive in its action, and by which the animal is surely impaled or caught.

Other objects and advantages of the invention will hereinafter appear, and the novel features thereof will be particularly pointed out in the appended claims.

The invention is clearly illustrated in the accompanying drawings, which, with the letters of reference marked thereon, form a part of this specification, and in which—

Figure 1 is a side elevation of my improved trap. Fig. 2 is a vertical section through the same. Fig. 3 is a plan view.

Like letters of reference indicate like parts throughout the several views.

Referring now to the details of the drawings by letter, A designates the uprights, the lower ends of which are preferably pointed, so that they may be readily driven into the ground, and near their lower ends is a ring B, held thereon in any suitable manner and having apertures $b$, through which pass the spikes or equivalent C, the upper ends of which are secured in the upper ring D, having apertured lugs embracing the uprights or posts and upon which the said ring is adapted to slide.

E are springs around the uprights and acting upon the upper ring to normally hold the same downward. The upper ends of the uprights are connected by a cross-bar F, held thereto in any suitable manner, and G is a spring arranged beneath said cross-bar, the tension of which is adjusted by a set-screw $g$, acting thereon.

H is a trigger pivoted at $h$ on one of the uprights, the tooth $h'$ of which is adapted to engage in a notch $d$ on the upper ring D. Pivotally mounted on one of the uprights beneath the lower ring is an arm I, having a lug $i$, connected with the free end of the trigger H by a rod J.

In operation the trap is set by driving the uprights into the ground over the mole-run and the upper ring pulled upward against the tension of the springs until the trigger is engaged in the notch of said upper ring. As the animal passes beneath the arm I he raises the latter and immediately thereon the trigger is disengaged from the notch in the upper ring, when the springs force the same downward and the spikes, passing through their guide-openings, are forced through the animal and impale him. The spring G is adjusted so as to cause the trap to throw more or less easily, as required.

What I claim as new is—

1. The combination with the uprights and the lower ring, of the upper ring carrying spikes and slidingly mounted on the uprights, springs encircling said uprights and acting on the upper ring to force it downward, a trigger to hold the upper ring upward, a means for disengaging the trigger, and a spring acting on said trigger, substantially as and for the purposes specified.

2. The combination with the uprights and the lower ring, of the upper ring slidingly mounted on the uprights, springs acting on the upper ring to force it downward, a trigger to hold the upper ring upward, a means for disengaging the trigger, a spring acting on said trigger, and means for adjusting the faces of said spring, substantially as and for the purposes specified.

3. The combination with the uprights, the lower fixed ring having openings, the upper ring mounted to slide on the uprights, and provided with spikes working through openings in the lower ring springs acting on the upper ring the latter being formed with a notch, a trigger pivoted on one of the uprights and adapted to engage said notch, a spring acting on said trigger, a set-screw acting on said spring, a trip-bar pivotally mounted on one of said uprights beneath the lower ring and a connection between the same and the trigger, substantially as and for the purposes specified.

In testimony whereof I have signed this specification in the presence of two subscribing witnesses.

JAMES WILLIAM JONES.

Witnesses:
WALTER H. COLLINS,
R. S. HUNSUCKER.